United States Patent
Sinha et al.

(10) Patent No.: US 7,783,873 B2
(45) Date of Patent: Aug. 24, 2010

(54) EXTENDED FORMAT FOR INITIALIZATION FILES

(75) Inventors: Dinesh Sinha, North Brunswick, NJ (US); Chitra Ramaswamy, North Brunswick, NJ (US)

(73) Assignee: Tacit Networks, Inc., South Plainsfield, NJ (US)

( * ) Notice: Subject to any disclaimer, the term of this patent is extended or adjusted under 35 U.S.C. 154(b) by 428 days.

(21) Appl. No.: 11/739,361

(22) Filed: Apr. 24, 2007

(65) Prior Publication Data
US 2007/0250694 A1    Oct. 25, 2007

Related U.S. Application Data

(62) Division of application No. 10/881,448, filed on Jun. 30, 2004, now abandoned.

(51) Int. Cl.
*G06F 15/177* (2006.01)

(52) U.S. Cl. .............. 713/1; 707/755; 709/220

(58) Field of Classification Search ............ 713/1; 707/755; 709/220
See application file for complete search history.

(56) References Cited

U.S. PATENT DOCUMENTS

| | | | |
|---|---|---|---|
| 6,950,818 B2 | 9/2005 | Dennis et al. | |
| 2004/0204949 A1 | 10/2004 | Shaji et al. | |
| 2004/0215650 A1* | 10/2004 | Shaji et al. | 707/102 |
| 2005/0005233 A1 | 1/2005 | Kays et al. | |

* cited by examiner

*Primary Examiner*—Albert Wang
(74) *Attorney, Agent, or Firm*—Baker Botts L.L.P.

(57) ABSTRACT

A method is disclosed comprising initializing and/or modifying a first set of computer configuration data for a first user based on the first user's membership in a first group, initializing and/or modifying a second set of computer configuration data for the first user without regard to the first user's membership in the first group The first or second sets of computer configuration data may be stored in an initialization file. The computer configuration data may be computer hardware of computer software data.

20 Claims, 9 Drawing Sheets

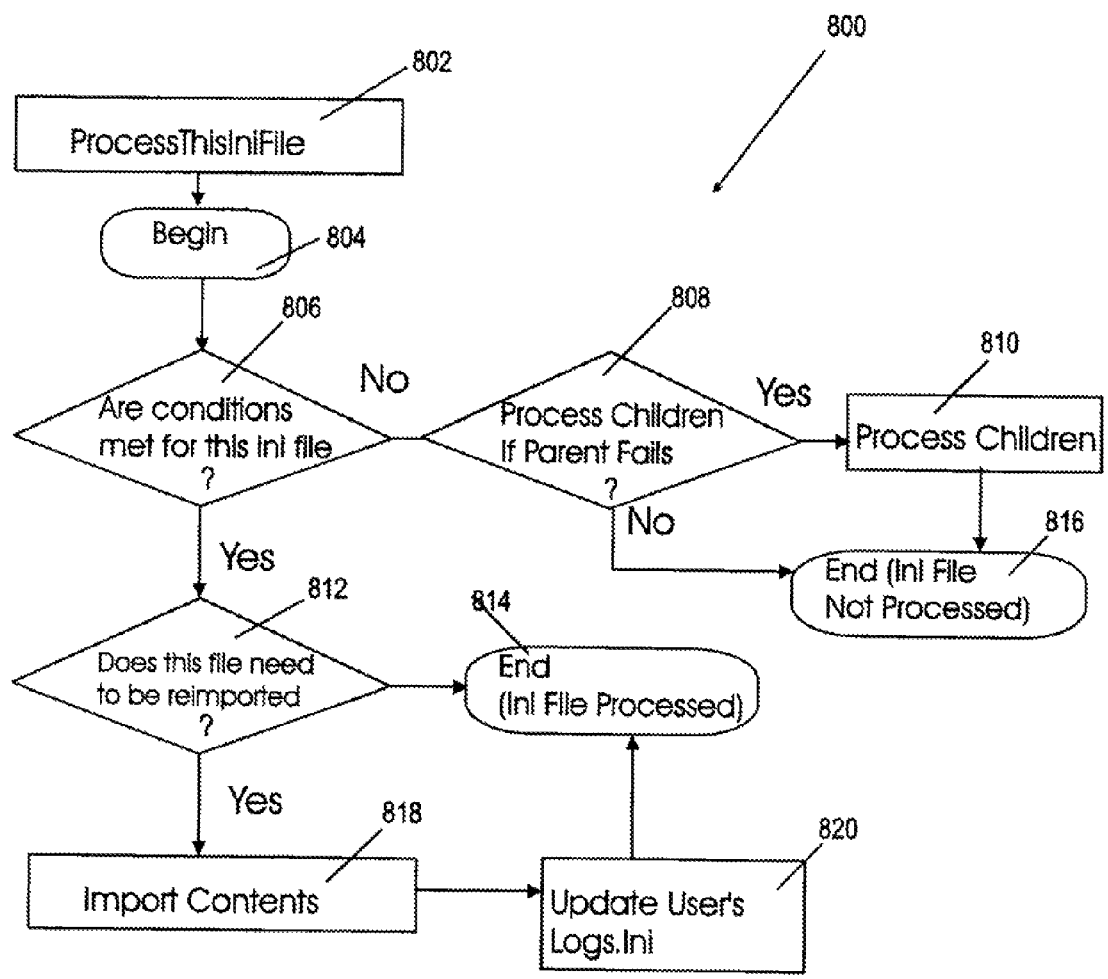

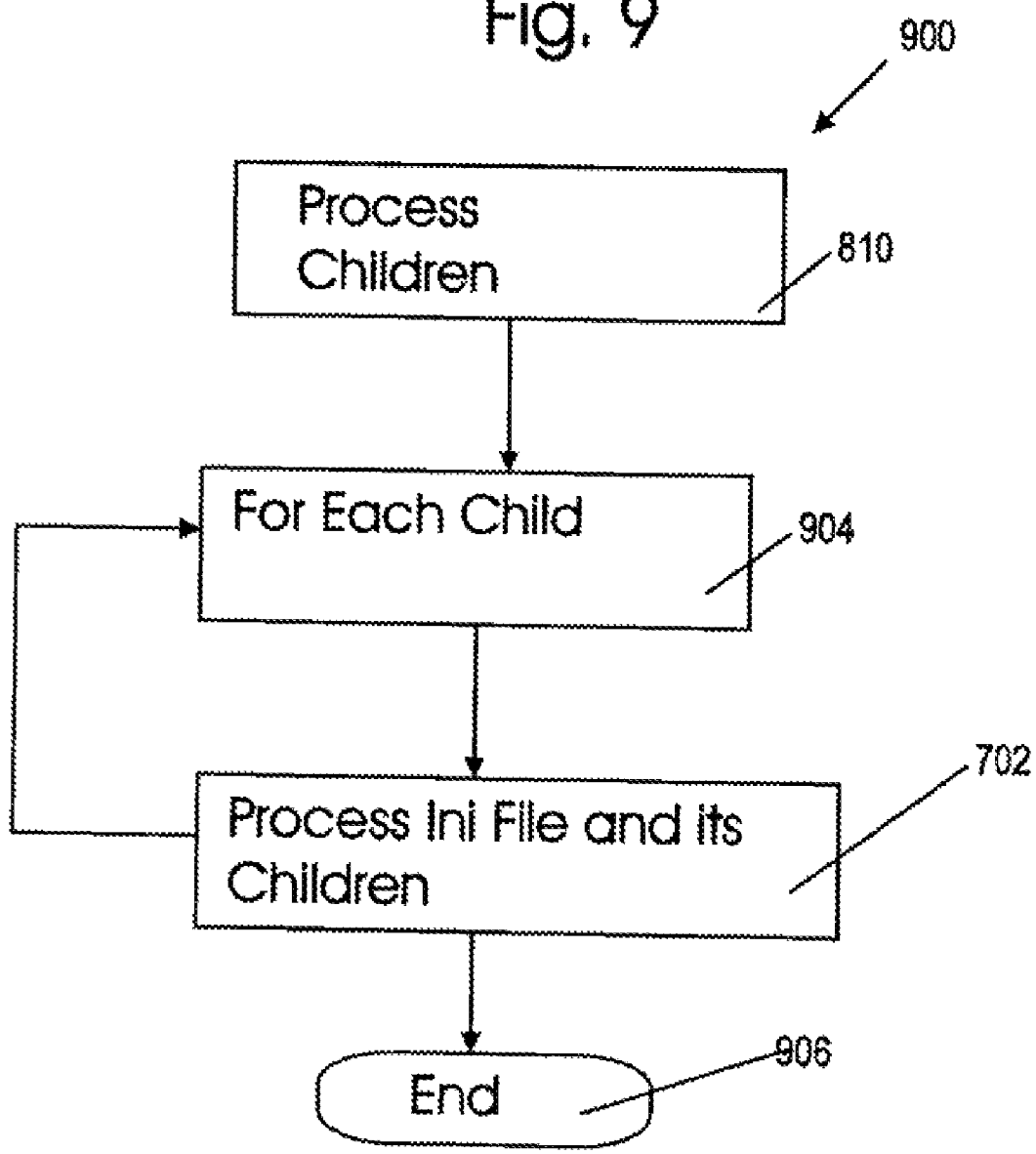

EXTENDED FORMAT FOR INITIALIZATION FILES

REFERENCE TO RELATED APPLICATION

This application is a divisional application that claims the benefit of U.S. patent application Ser. No. 10/881,448 now abandoned, entitled "Using Hierarchical INI Files to Represent Complex User Settings in a Multi User Environment", filed on Jun. 30, 2004, which is hereby incorporated by reference for all purposes.

FIELD OF THE INVENTION

This invention relates to improved methods to configure and maintain user settings in a multi user environment.

BACKGROUND OF THE INVENTION

The files used to initialize settings for a computer, computer program, and/or computer network for individual users are referred to as initialization files. Different computer programs read from these initialization files to determine the configuration of the computer, computer program and/or computer network for the individual user. It is a common practice to keep these initialization files in a simple text format as opposed to a proprietary format. Keeping these files in a simple text format has plenty of advantages. This brings forth simplicity in structure. This also implies that these initialization files can be read and edited by any text editor as opposed to having a proprietary tool that understands the format of these files to let any file operation possible on these initialization files by the user. It is also very easy to read and write to an initialization file: as different library functions exist in a variety of languages and scripts to read and write to a text file. Examples of these initialization files in text format are plenty. In UNIX (trademarked) environments, a profile text file initializes the environment for a user at login time. A similar task used to be done in DOS through a config.sys file. Microsoft Windows (trademarked) 3.X, Windows (trademarked) 9X, Microsoft Windows NT (trademarked), Microsoft Windows 2000 (trademarked) and Microsoft Windows XP (trademarked) use a variety of initialization files.

These initialization files can be broadly categorized into two types of files i.e. information files which have a it extension in their names (known in the art as inf files) and initialization files which have a .ini extension in their names (known in the art as ini files).

The structure of these initialization files—ini files and inf files are similar to each other and are comprised of a pair of ini entry and value, which are separated by an equal sign and divided into different sections. The sections are identified by section header which is a text string enclosed between square brackets. By using text based tags to identify sections, entry and values, ini and inf files preserve the text based nature of the file and at the same time bring an order to a text file to make it more structured to store settings.

Typically an inf file can be used to store computer hardware configuration data or information for a device. Ini files are used to hold computer software configuration data or information.

Ini and Inf files have the advantage of simplicity of structure associated with any text file. In addition to this advantage, by using the above-described format of dividing the file into sections, different settings can be bundled into different groups (identified by sections in ini and inf files). This gives users of the ini and inf files a little bit more flexibility compared to any other text file in terms of managing the data that is to be stored. One more advantage of files in ini and inf format is that there are tools available to read and write easily to these files (ini and inf files), such as "GenInf.exe" from Microsoft (trademarked) and "ChkInf.exe" from Microsoft (trademarked).

Looking at the structure of these ini and inf files in more detail, an ini or an inf file is divided into sections, which are identified by a section name typically called "IniSectionName". Each section is comprised of a number of entries (each typically called "IniEntry,") and their respective values (each typically called "IniEntryValue"). Therefore the IniEntryValue for a combination of IniSectionName and IniEntry defines a value (IniEntryValue) that a user will be initialized to for a given setting(IniSectionName and IniEntry). Logically, this implies that a sequence of three strings (IniSectionName, IniEntry, IniEntryValue) can define the configuration for a user. This setting can be a particular software setting or user environment in that computer system or in the organizational network The computer software settings or configuration that the initialization files in text format intend to deploy can be for all the users, for a group of users or an individual user of a computer or computer network. In the real world, configurations are deployed at an organization level where users are divided into different groups and subgroups where any single user can derive certain properties from the group or sub group to which he or she belongs to or have certain set of his or her own unique attributes. It would be very advantageous to use the text based initialization files in this scenario due to their advantages already listed above.

However, due to its simplicity of structure, these initialization files in text format in their current form are not well suited to initializing and modifying the configuration of a complex set of users divided into different groups and subgroups where any single user can derive certain properties from the group or sub group to which he or she belongs to or have certain set of his or her own unique attributes.

SUMMARY OF THE INVENTION

The present invention in one or more embodiments, describes a method for initializing and modifying the configuration of a complex set of users divided into different groups and subgroups possible in the framework of initialization files in text format using an extension of the format of an ini or an inf file as an example. This idea can very well be shown using similar extensions in other types of text based initialization files like config.sys, .profile or XML files. In this method any single user can derive certain properties from the group or sub group to which he or she belongs to or have a certain set of his or her own unique attributes. Employing an initialization file in text format makes the usability simple and easy. At the same time, the extensions provided to the text based initialization file can deal with configuring a set of users belonging to a hierarchy of groups and subgroups easily.

This invention, in one or more embodiments describes a method for initializing and modifying computer software configuration data for a complex set of users divided into different groups and subgroups where any single user can derive certain properties from the group or sub group to which he or she belongs to or have certain set of his or her own unique attributes. In at least one embodiment, an initialization file structure is used. The text based initialization file structure makes the usability simple and easy. At the same time, the extension of ini file structure can deal with configuring a set of users belonging to a hierarchy of groups and subgroups easily.

If we follow the current scheme of text based initialization file formats, the reason for them not being suitable to represent a set of users divided into groups and subgroups is:

1) It is not possible to give conditions under which a text based initialization file can have its contents imported by the software program it is supposed to configure.
2) It is not possible to link from one text based initialization file to the other.
3) There does not exist a scheme to parse multiple text based initialization files.

By making the above conditions possible by extending the scheme of ini/inf files as an example, we automatically meet the requirement stated.

This invention describes a simple method of specifying conditions in an extension to the ini file. The parsing software is designed to parse this text based initialization file only when the stated conditions are met.

Similarly, this invention describes a method to link from one text based initialization file to a set of other text based initialization files. This implies that a configuration specific to a given set of conditions is grouped together in one text based initialization file. Different configurations are maintained in a set of text based initialization files. Subsequently, they are linked together appropriately so that they all can be traversed in a specific order.

Thirdly, this invention describes a scheme to traverse multiple text based initialization files. In this scheme, the first file that is traversed is the root initialization file. A child initialization file is traversed if it has links from a parent initialization file and the conditions listed to parse the child initialization file are met. For optimization purpose, if an initialization file is already imported into the user settings and none of the conditions have changed or none of the contents of the initialization file has changed, the initialization file settings need not be imported at this time.

BRIEF DESCRIPTION OF THE DRAWINGS

FIG. 8 is a flow chart showing a method of processing a particular initialization file; and FIG. 9 is a flow chart showing a method of processing children files of a particular initialization file.

DETAILED DESCRIPTION OF THE DRAWINGS

Table 1, which follows, shows a typical "Ini" or "Inf" computer software file layout. Comments are shown in Table 1, starting on a new line, prefixed by at least one semicolon, and in italics. Disregarding the comments, the "Ini" or "Inf" file shown by the Table 1 is divided into different parts called sections. The sections in the ini file in Table 1 are "IntPreferences" and "Project1".

The sections in the "Ini" or "Inf" file shown by Table 1, are marked by the IniSectionName specified at the beginning of the section within square brackets. In this case the "IniSection Name" is "[IntPreferences]". Everything that follows an IniSectionName, such as "[IntPreferences]" shown in Table 1, is the body of that section till the next IniSectionName shown in Table 1, which is "[Project1]". "[Project1]" specifies the beginning of the next section. Within each section, there can be any number of IniEntries and associated IniEntryValues. For example for section "[IntPreferences]", there is an IniEntry of "AlertOnTotalSyncAbortCount", which has an IniEntryValue of "1" and an IniEntry of "AlertOnTotalConflictCount", which has an IniEntryValue of "1". For section "[Project]" there is an IniEntry of "ProjectName", which has an IniEntryvalue of "OfficeVNHomeFolder" (which may be some predefined constant understood by the program as a string setting), an IniEntry of "Description", which has an IniEntryValue of "Office's Home Folder" (which may be some predefined constant understood by the program as a string setting), and an IniEntry of "SyncAlways", which has an IniEntryValue of "1".

Each IniEntry shown in Table 1 is a key name, which generally specifies a specific setting name. The value to be specified is the portion of the line following the IniEntry shown in Table 1 after a particular '=' sign. There are computer software routines available to read this value as an integer, string, binary and a few other forms.

TABLE 1

| Typical Ini / Inf file structure (comments in italics) |
| --- |
| *;; Next line is an example of IniSectionName*<br>[IntPreferences]<br>*;; AlertOnTotalSyncAbortCount is an example of IniEntry*<br>*;; and 1 is an example of IniEntryValue*<br>AlertOnTotalSyncAbortCount=1<br>AlertOnTotalConflictCount=1<br>ExeSetUpLocation=\\192.168.0.14\users\setuprel50eval.exe<br>[Project1]<br>ProjectName=OfficeVNHomeFolder<br>Description=Office's Home folder<br>SyncAlways=1 |

Figure 1:
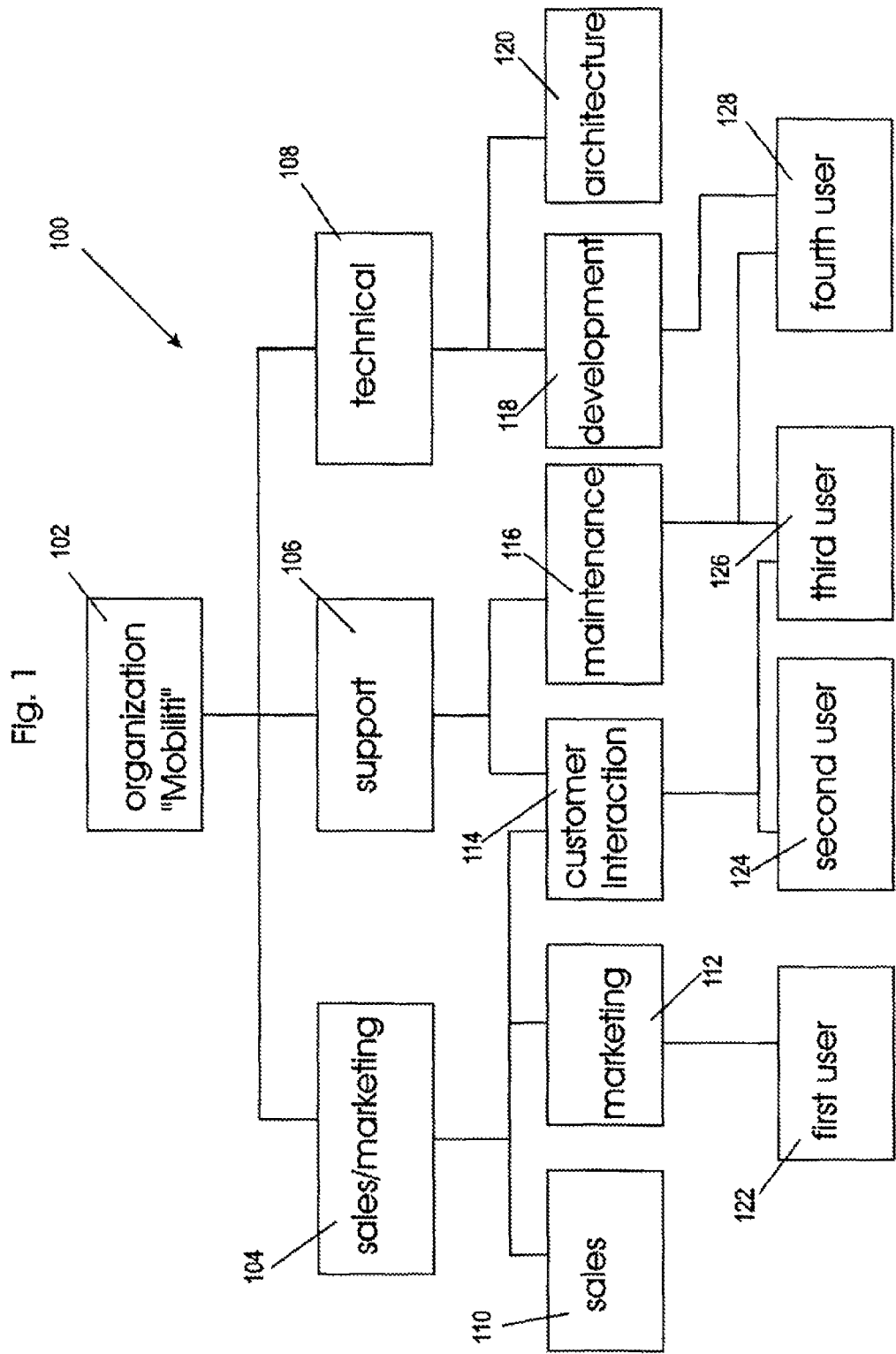
FIG. 1 is a block diagram of a multi-tier structure of users in an organization.

Since this invention deals with rolling out preferences in an organization that has users organized in a multi-tiered arrangement, FIG. 1 describes a typical scenario of this multi-tiered organization of users. FIG. 1 shows a block diagram 100. As shown by diagram 100, everyone in an organization 102 of "Company A" is divided into 3 groups—Sales & Marketing 104, Support 106 and Technical 108. These are further divided into sub-groups. Sales & Marketing 104 is divided into Sates 110, Marketing 112, and Customer Interaction 114. Support 106 is divided into Customer Interaction 114 and Maintenance 116. Technical 108 is divided into Development 118 and Architecture 120. A first user or first person, 122 belongs to Marketing 112, a second user or person belongs to Customer Interaction 114, a third user or person 126 belongs to customer interaction 114 and maintenance 116, and a fourth user or person belongs to both maintenance 116 and development 118.

Through the first, second, third, and fourth user computers, the present invention in one or more embodiments, attempts to cover four distinct scenarios. The concept can be further extended to any other type of user/group association.

Table 2, which follows, describes an example of sample preferences that can be deployed in the organization of users, subgroups and groups shown in FIG. 1. The example shown in Table 2 shown illustrates the concept of rolling out preferences in a complex organization and is to be treated as an example requirement for the subsequent descriptions. Concepts are introduced through the description of meeting this example requirements specified in Table 2 and are generalized during the description that follows. Settings can be a combination of settings that can be deployed to everyone in the organization, group wide, subgroup wide or specific to the user. An example of a setting in this case, which is deployed organization wide, is the variable "UsernameFolder", shown in the first module of Table 2. In this example, the variable "UsernameFolder" always has the value of the organization's main server and share, in this case "\\OrgServer\Share" as shown in Table 2, with the current user name appended to it, e.g. "\\OrgServer\Share\User1" (for the First User 122 shown in FIG. 1). The variable or field "Organization" in Table 2 is another setting in this example, which would be deployed organization wide. For example, if the name of the organization is "Mobiliti", the variable "Organization" is to be set to "Mobiliti" for all the users in this example. The other variables wilt be set depending on whether an individual or computer or computer processor is within a group or subgroup. For example, everyone in Support group 106 will have their variable of "Support" set to 1. Everyone not in Support group 106 will have a variable "Support" set to 0. Similarly, there will also be a variable or field, which will be set depending on whether an individual or computer or computer processor is in a subgroup. For example, members of Maintenance group 116 of FIG. 1 will have the variable "Maintenance" set to 1. Non-members of Maintenance group 116 would have their variable "Maintenance" set to 0.

TABLE 2

User Preferences To Be Deployed (comments in italics)

*;;;The settings to be received by the first user or User1*
UsernameFolder=\\Orgserver\share\User1
*;;Everyone in the organization has this field set to this value*
Organization=Mobiliti
*;;everyone in marketing subgroups has this field or variable set to 1*
Marketing=1
*;;everyone in sales and marketing group has this field or variable set to 1*
SM=1
*;;;The settings to be received by second user or User2*
UsernameFolder==\\Orgserver\share\User2
*;;Everyone in the organization has this field set to this value*
Organization=Mobiliti
*;; everyone in customer interaction subgroups has this field set to 1*
CI=1
*;;everyone in sales and marketing group has this field se to 1t*
SM=1
Support=0
*;;;The settings to be received by third user or User3*
UsernameFolder==\\Orgserver\share\User3
*;;Everyone in the organization has this field set to this value*
Organization=Mobiliti
*;;everyone in maintenance subgroup has this field set to 1*
Maintenance=1
*;;everyone in customer interaction has this field set to 1*
CI=1
*;;everyone not in sales and marketing group has this field set to 0*
SM=0

TABLE 2-continued

User Preferences To Be Deployed (comments in italics)

Support=1
*;;;The settings to be received by fourth user or User4*
UsernameFolder==\\Orgserver\share\User4
*;;Everyone in the organization has this field set to this value*
Organization=Mobiliti
*;; everyone in development subgroups has this field set to 1*
Development=1
*;;everyone in maintenance subgroup has this field set to 1*
Maintenance=1
*;;everyone not in sales and marketing group has this field set to 0*
SM=0
*;;everyone in support group has this field set to 1*
Support=1
*;;everyone in technical group has this field set to 1*
Technical=1

Figure 2:
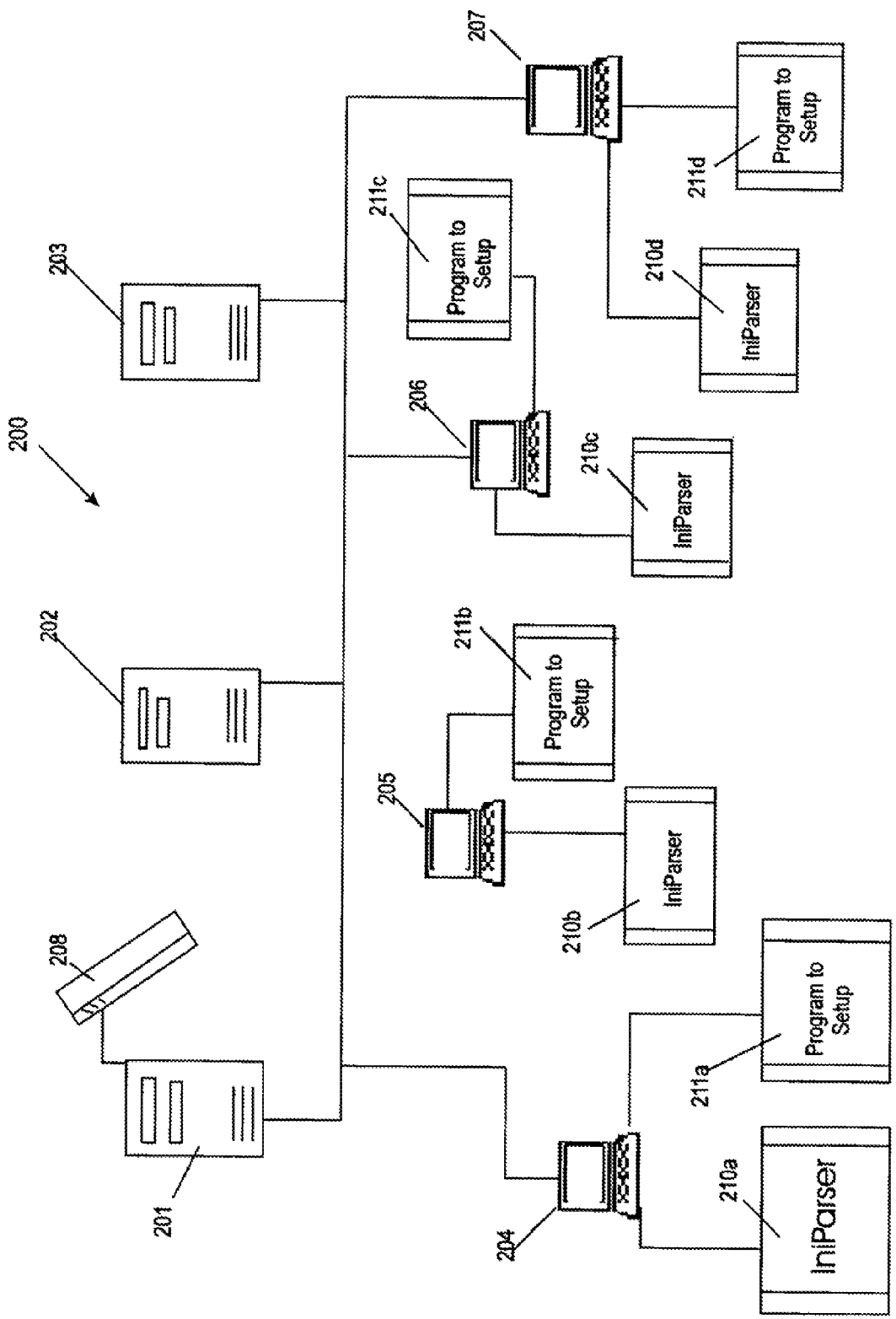
FIG. 2 shows a diagram of a plurality of server computers and user computers networked together and refers to computer software used by one or more of the server computers or user computers.

The general physical locations of components in a method and apparatus in accordance with at least one embodiment of the present invention, are described in FIG. 2. FIG. 2 shows an apparatus or network 200. The network 200 includes a mix of user computer workstations, including user computer workstations 204, 205, 206 and 207, and server machines, including server machines 201, 202, and 203. The apparatus or network 200 also includes a disk 208, where a Text based initialization file resides. The computer workstations 204, 205, 206, 207 and the server machines 201, 202, and 203 are connected together by bus 200a, which may be comprised of communications lines, such as any hardwired, wireless, or any other communication lines.

Each of the server machines 201, 202, and 203 can be a file server, a domain controller, a security server, or any other type of computer server. In the client server architecture for apparatus or network 200 shown in FIG. 2, computer programs 211a, 211b, 211c, and 211d can be running on the workstation computers 204, 205, 206, and 207, respectively. The computer programs 211a-d may be different from one another. Each of the computer programs 211a-d may have its own set of preferences. In the example of FIG. 2, the administrator of the organization such as the organization identified in Table 2, typically would like to control what goes in as the preferences for the programs 211a-d.

An apparatus and method in accordance with at least one embodiment of the present invention, stores the preferences for the programs 211a-d in a Text based initialization file format and stored on the workstation 204-207, or from a network Text based initialization file, such as stored in disk 208. Each of the workstations 204-207 may have a client program running on it, which can import these preferences or settings. The workstations 204-207 may each include memory. The preferences or settings can also reside in memory of each of the client workstations 204-207. Many client computer programs running on one of the workstations 204-207 currently can initialize themselves from a local Text based initialization file, such as stored on the workstation 204-207, or from a network Text based initialization file, such as stored in disk 208. Therefore, these client computer programs may have a parser module that is responsible for processing Text based initialization files to import the desired settings for the client computer program. Although not all of the client computer programs 211a-d may initialize their settings from an a "Text based initialization" file, for this invention, it is assumed that these programs can be changed to read the settings from a Text based initialization file or some other similar text format using a parser computer software routine—such as one of "IniParser" computer programs

210*a-d*. This process should be quite elementary to do for an experienced software developer. This parser can be a part of one of the client computer programs 211*a-d*, or it can be a separate computer program.

Whether the Text based initialization files are stored in network storage 208 or locally in memory of one of the workstations 204, 205, 206 or 207, it is difficult to deploy settings in a scenario where the users are organized in multiple tiers and a different group of settings are to be deployed from different levels in a multi-tiered architecture similar to the one described in FIG. 1.

Table 3 describes an aspect of the invention to extend the format of Text based initialization files, maintaining a structure similar to "ini" file text format to make it possible to deploy settings from multiple levels in a multi-tier organization of users. We call this format "extended ini file format". Table 3 proposed a few new constructs in the existing "Ini" file structure to make it in an "extended ini file format". Similar constructs can be used to extend for any other text-based formats easily. The given scheme retains the "Ini" file structure. It adds to it two key sections. First is the "[inifiles]" section shown in Table 3. This is the section where all the children "Ini" files to be parsed are listed. The "IniEntry" for the variable "NumberOfChildIniFiles" shown in table 3 denotes the number of children present. In table 3 the number of children "Ini" files present is "2". From this "IniEntry-Value" of "2", the parser routine 310*a* shown in FIG. 2 knows the number and name of IniEntries where the value of the child Ini files are stored. As an example, if the NumberOf-ChildIniFiles is 2, the IniEntries containing the name of the child Ini files would be 1 and 2.

In the example of Table 3, the two children ini files are "child1.ini" and "child2.ini". The second section is the "[conditions]" section. This IniSection specifies the conditions when this Ini file should be processed by the parser routine 210*a*. If the conditions are not met, then this Ini file would not be processed further. The number of conditions is listed out in the IniEntry for the variable "NumberOfConditions". If the value is 3 (as in the example in Table 3), then the name of the conditions' IniEntries are 1, 2 and 3. If any of these conditions are satisfied, then the Ini file is processed. The condition statement itself can be specified as multiple conditions separated by a semicolon. For the condition statement to be true, each sub condition needs to be true. Therefore, the logical operator between sub conditions in a condition statement is "and" whereas the different condition statements are "ored". Of course, it is quite elementary to include other condition statements such as "or", "and", "equal", "not equal to", etc. So in the example of Table 3, if conditions 1, 2 and 3 are met, only then this particular Ini file would be parsed.

The syntax of the condition is that every sub condition is separated by ';' (semi-colon). Also, any environment variable to be included in a condition can be enclosed between "%" symbols. Environment variables are defined at the user's profile level by the operating system. The value that the user gets for an environment variable can be decided by the administrator or the end user. Some environment variables that are used commonly across operating systems e.g. Windows (trademarked) 9X, Windows (trademarked) 2000, Windows (trademarked) XP, UNIX (trademarked) are "path" (stores the set of directories where the operating system will search for an executable file by default) or "temp" (stores the location of the temporary folder).

The first condition number in the table 3 would be true only if the environment variable "group" has the value "Support" and the environment variable "subgroup" has the value "maintenance".

The syntax of a condition can be specified as
ConditionName=Subcondition$_1$;Subcondition$_2$; . . . Subcondition$_n$.

Each sub condition can follow the syntax of a logical condition e.g. [% environment variable %] [logical operator] [value].

In the example of Table 3, this Ini file would be parsed further only if any of the conditions: 1, 2, or 3 hold true. Another IniEntry for a variable "ProcessChildIfParentConditionFails" is also shown in Table 3. If the value of this variable is 1, even if this Ini file is not parsed further because the conditions are not met, the children listed in the [Inifiles] section in table 3 are still processed further. "ProcessChildFirst" IniEntry specifies the order of parsing between children and parent. If children settings are to override the parent setting, the parent should be parsed before child. If children settings are to be overridden by the parent setting, the children should be parsed first. In that case, this IniEntry ProcessChildFirst should be given the value of 1.

TABLE 3

Proposed scheme for extended ini file structure (comments in italics)

*;;;;First two sections are general sections that are already*
*described in table 1,*
[IntPreferences]
AlertOnTotalSyncAbortCount=1
AlertOnTotalConflictCount=1
ExeSetUpLocation=\\192.168.0.14\users\setuprel50eval.exe
[Project1]
ProjectName=OfficeVNHomeFolder
Description=Office's Home folder
SyncAlways=1
*;;This section(IniFiles) specifies all the children ini files that are to be*
*;;parsed and some rules as to how they are parsed*
[inifiles]
NumberOfChildIniFiles=2
*;;First child*
1=child1.ini
*;;Second child*
2=child2.ini
*;;All the conditions to parse this ini file are listed in ;;this*
*section "conditions"*
[conditions]
NumberOfConditions=3
*;;Condition 1*
1=%group%=Support;%subgroup%=Maintenance
*;;Condition 2*
2=%os%=WindowsXP
*;; Condition 3*
3=%os%=Windows2000
*;;If ProcessChildIfParentConditionFails 510 has value 0, the children*
*;;won't be parsed if the conditions*
*;;in this section are not met*
ProcessChildIfParentConditionFails=1
*;; If ProcessChildFirst 511 has the value 1, the Child ini files are parsed*
*;; before this ini file's rest of the sections are parsed*
ProcessChildFirst=0

Figure 3:
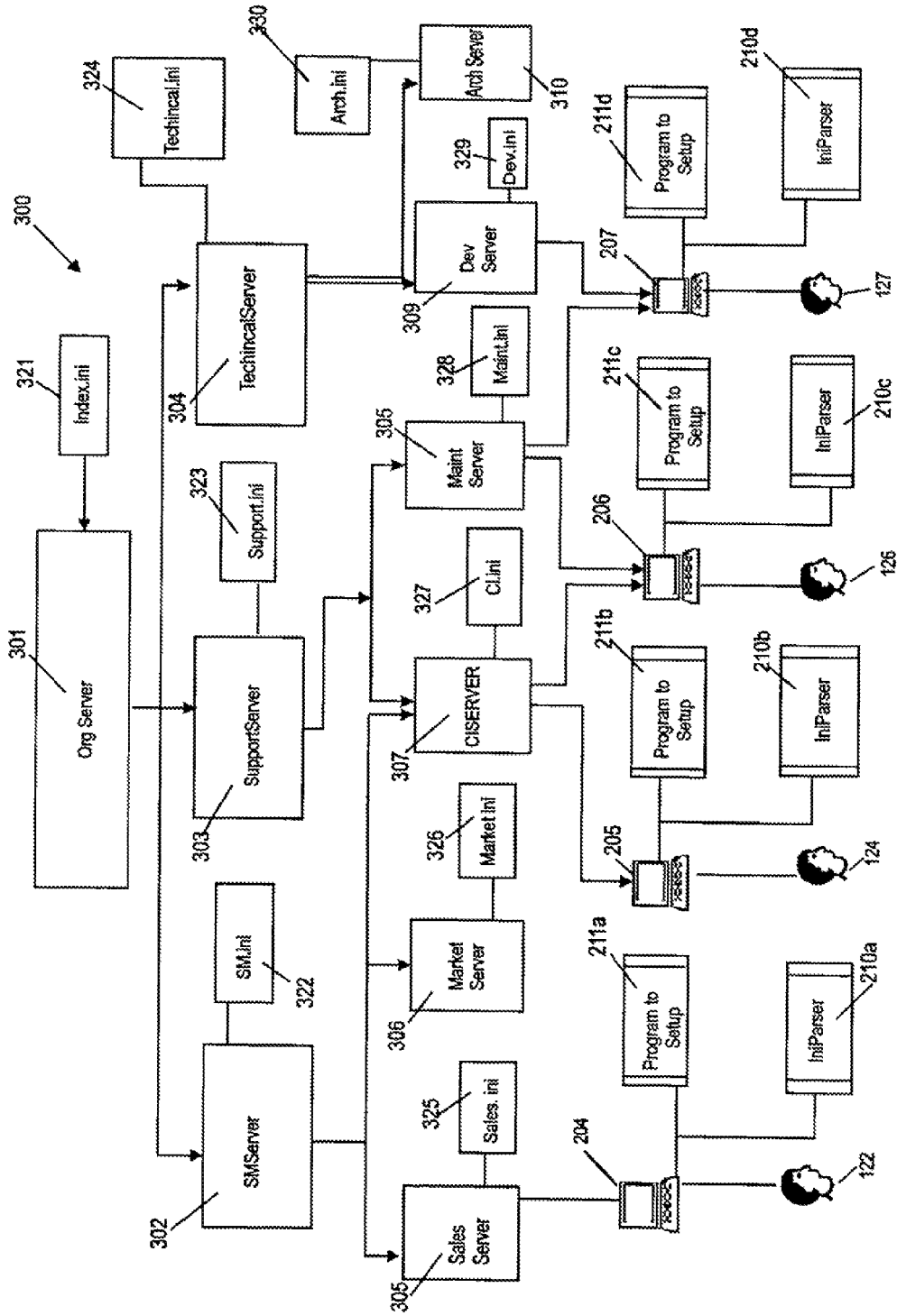
FIG. 3 shows a scheme of organization of multiple Ini files to meet the requirement of pushing different levels of preference in a multi-tier organization of users and their physical location.

FIG. 3 shows diagram 300 of an organization of multiple Ini files. FIG. 3 shows the arrangement of servers and clients for the example described in FIG. 1. FIG. 1 described the organization in terms of organization structure. FIG. 3 describes it more with the perspective of organization structure along with the association of respective groups with the servers and the user workstations In the scheme of one or more embodiments of the present invention. FIG. 3 also gives an example of physical deployment of the extended ini files to meet the requirement summarized in the requirements described in Table 2.

In the example of FIG. 3, the main file server for the organization is OrgServer 301. The settings that are deployed at the organization level can be enclosed in a file index.ini file 321, which can be stored in a shared directory or computer memory, e.g. \\OrgServer\Share. This is the first ini file that the computer software parser routines 210a-d are designed to process. These parser routines 210a-d are responsible for deploying the settings for computer software programs 211a-d, which reside on the client workstations 204-207, respectively, or on all of them. Corresponding to each group, of the groups shown in FIG. 1, there is a server, which in turn has a Ini file that deploys settings specific to the group level. Therefore, SMServer 302 is the server for the group Sales & Marketing group 104 and a file in this share or shared memory directory in this server—\\SMServer\Share\SM.ini 322, has stored therein, the settings to be deployed at the group level for the Marketing group 104. SupportServer 303 is the server for the group Support 106 shown in FIG. 1, and a file in this server—\\SupportServer\Share\Support.ini 323 has stored therein, the settings to be deployed at the group level for the Support 106 group. TechnicalServer 303 is the server for the group Technical 108 and a file in this server—\\TechnicalServer\Share\technical.ini 324, has stored therein the settings to be deployed at the group level for the group Technical 108.

The groups in this organization are further subdivided into subgroups. A server 305 is the server for the subgroup Sales 110. A file in this server—\\SalesServer\Share\Sales.ini 325, has stored therein the settings to be deployed at the subgroup level for the subgroup Sales 205. A server 306 is the server for the subgroup Marketing 112 of FIG. 1. A file in this server—\\MarketServer\Share\Market.ini 326, has stored therein the settings to be deployed at the subgroup level for the subgroup Marketing 112. A server 307 is the server for the subgroup Customer Interaction 114. A file in this server—\\ClServer\Share\Cl.ini 327, has stored therein, the settings to be deployed at the subgroup level for the subgroup Customer Interaction 114. A server 305 is the server for the subgroup Maintenance 116. A file in this server—\\MaintServer\Share\Maint.ini 328 has stored therein the settings to be deployed at the subgroup level for the subgroup Maintenance 116. A server 309 is the server for the subgroup Development 118. A file in this server—\\DevServer\Share\Maint.ini 329 has stored therein the settings to be deployed at the subgroup level for the subgroup Development 118. A server 310 is the server for the subgroup architecture 120. A file in this server—\\ArchServer\Share\Arch.ini 330, has stored therein the settings to be deployed at the subgroup level for the subgroup Architecture 120. Additionally, the user workstations 204, 205, 206 and 207 for the users 211 212, 213 and 214, respectively, will have the actual computer software 211a-d, respectively, running whose preferences are to be deployed. Ini Parser modules 210a-d (which may be a part of this software) is also running on these client workstations 204-207. Ini Parser Modules 210a-d may be a part of the actual computer software itself.

Table 4 shows the contents of the extended ini files described above i.e. 321, 322, 323, 324, 325, 326, 327, 328, 329 and 330 correspond to first module of table 4-index.ini file, second module of table 4-sm.ini file, third module of table 4-support.ini file, fourth module of table 4-technical.ini file, fifth module of table 4-sales.ini file, sixth module of table 4-market.ini file, seventh module of table 4-Cl.ini file, eighth module of table 4-maint.ini file, ninth module of table 4-dev.ini file, tenth module of table 4-arch.ini file, and eleventh module of table-4 logs.ini file. The root extended ini file i.e. index.ini contains settings that are to be deployed enterprise wide. This includes the "Organization" variable, which is set to a value of "Mobiliti" in this example. The next setting "UsernameFolder" though is deployed at enterprise level, it has a different value for every user. This takes the help of an environment variable "username".

An environment variable defines some aspect of a user's or a program's environment that can vary. Generally set during the login procedure, for a user the environment variable establishes some component of the users working environment, such as the default printer, browser, or text editor to be used. Because these are preset as values specific to the identified user, they save time that would be used selecting them at each login. Environment variables are used across multiple languages and operating systems to provide information to applications that may be specific to the user request. It is important to realize that this invention does not deal with setting the values of environment variables. It is assumed that the respective environment variables are already defined in the organization. If they are not defined, there are different easy ways to define environment variables to appropriate values. Environment variables are setup through different methods like startup files (.profile in UNIX, autoexec.bat and other batch files in Windows 9X, Windows 2000, NT and XP), login scripts or software settings or any other method).

The Ini File Parser computer program, such as one of 210a-d, is responsible for interpreting the environment variable and importing the IniEntryValue based on the current value of the environment variable. Therefore for the first user or User1, when parsing the file index.ini, the IniEntryValue for IniEntry "UsernameFolder" would be translated as \\Orgserver\share\User1, since the environment variable "username" has the value User1. Similarly for User4, this IniEntryValue would be taken as \\Orgserver\share\User4. The rest of the entries provide default values to the rest of the settings that are to be imported. For example, unless a child ini file overrides the setting "SM", this setting will have the value 0 by default. The second section "IniFiles" lists out the children Ini files. The conditions section's first IniEntry ProcessChildIfParentConditionFails having the value 1 specifies that even if this Ini file is not getting processed due to some condition, continue with processing the children Ini files. "ProcessChildFirst" having IniEntryValue 0, shown in the first module of table 4 ensures that this ini file ("Index.ini") is processed completely, before any of the children Ini files are parsed.

Next are listed, in Table 4, the Ini files corresponding to the groups, sm.ini 322, support.ini 323, and technical.ini 324. We now describe one of these ini files—sm.ini 322. The other files 323 and 324 are similar in structure to file 322. The preferences section of this file deploys the setting SM=1. So for users who parse this ini file have the setting SM overridden to the value 1, which is otherwise 0 (the value of 0 was set by index.ini). The IniFiles section specifies the children Ini files that are to be parsed i.e. \\SalesServer\Share\Sales.ini, \\MarketServer\Share\market.ini and \\ClServer\Share\Cl.ini. The conditions sections first two entries are similar to index.ini, which has been described previously. The last two IniEntries specify the only condition to exist for this sm.ini file to be parsed and imported into the software settings. NumberOfConditions IniEntry specifies that there is only one condition. The IniEntryValue "1" for the IniEntry "Number of Conditions" lists the number of conditions, which specifies that this ini file is to be parsed and imported only when one of the setting specified below (in this case IniEntry 1 is the only condition) is satisfied. The condition expressed in the IniEntry "1" specifies the environment variable "group" has the value set as a constant "SM". The environment variable "Group" is expected to be set organization wide in this example to the value of the constant string corresponding to the users group. Therefore, environment variable "group" is set to "SM" for everyone in sales and Marketing and to "support" for everyone in support. So in this example, this extended ini file SM.ini would be processed further only if environment variable "group" is set to "SM".

Next are listed the ini files corresponding to the subgroups i.e. sales.ini 325, market.ini 326, CI.ini 327, Maint.ini 328, Dev.ini 329 and Arch.ini 330. We now describe one of these ini files—sales.ini 325. Each of the subgroup in files 326, 327, 328, 329, and 330 are similar in structure to the sales.ini file. The preferences section of the sales.ini file deploys the setting Sales=1. So for users who parse this ini file as it satisfies the conditions specified in the conditions section, have the setting Sales overridden to the value 1 which is otherwise 0 (in this example, index.ini had earlier set this value to 0). The conditions sections' first two entries are similar to index.ini, which has been described previously. The last two IniEntries specify the only condition to exist for this ini file to be parsed and imported into the software. NumberOfConditions IniEntry specifies that there is only one condition. The IniEntry 1 for "Conditions" lists the only condition, which specifies that this ini file is to be parsed and imported only when the environment variable "subgroup" has the value "Sales". The last ini file that will be described is logs.ini. It is different from the other ini files as this is not an ini file that is prepared by the person or team who is responsible for deploying the setting. It resides on each workstation where the computer software to be configured is installed (204, 205, 206, and 207) and is the output of one of the parsing modules 210a-d. The logs.ini file has multiple purposes which includes optimizing the import of ini files by not importing all the files all the time, but only importing ini files which are necessary to be imported. Therefore, it lists out time stamps of all the ini files starting from index.ini till the last ini file that was actually processed as sections i.e. IniSections. The section name contains the fullname of the ini file where each part of the name is separated by the keyword '$' (or any other character that is not conventionally used in naming a file or directory in different file systems). In this section is stored the time stamp of any ini file when it was imported last by this user. If the last modified time of this ini file has changed, this ini file needs to be reimported again by this user. Alternatively, instead of time stamp, the actual file check sum can be stored to make the idea less dependent of last modified time of files and base it on actual content of the file. Also listed in this section are all the environment variables that were encountered while parsing this ini file along with its value. Therefore, if any of the values of these environment variable changes, this ini file needs to be reparsed.

TABLE 4

Individual Ini Files in the scheme (comments in italics)

*;;;index.ini file*
[Preferences]
*;;Everyone in the organization has this field set to this value*
Organization=Mobiliti
UsernameFolder==\\Orgserver\share\%username%
SM=0
Support=0
Technical=0
Sales=0
Marketing=0
CI=0
Maintenance=0
Development=0
Architecture=0
[inifiles]

TABLE 4-continued

Individual Ini Files in the scheme (comments in italics)

*;;This section specifies all the children ini files that are to be parsed*
*;;and some rules as to how they are parsed*
NumberOfChildIniFiles=3
1=\\SMServer\Share\SM.ini *;;First child*
2=\\SupportServer\Share\Support.ini *;;Second child*
3=\\TechnicalServer\Share\technical.ini *;;Third child*
[conditions]
ProcessChildIfParentConditionFails=1
ProcessChildFirst=0
*;;sm.ini file located at \\SMServer\Share*
[Preferences]
SM=1*;;Everyone Sales & marketing has this field set to this 1*
[inifiles]
*;;This section specifies all the children ini files that are to be parsed*
*;;and some rules as to how they are parsed*
NumberOfChildIniFiles=3
1=\\SalesServer\Share\Sales.ini *;;First child*
2=\\MarketServer\Share\Market.ini *;;Second child*
3=\\CIServer\Share\CI.ini *;;Third child*
[conditions]
ProcessChildIfParentConditionFails=0
ProcessChildFirst=0
NumberOfConditions=1
1=%group%=SM
*;;support.ini file located at \\SupportServer\Share*
[Preferences]
Support=1*;;Everyone in Support group has this field set to this 1*
[inifiles]
*;;This section specifies all the children ini files that are to be parsed*
*;;and some rules as to how they are parsed*
NumberOfChildIniFiles=2
1=\\CIServer\Share\CI.ini *;;First child*
2=\\MaintServer\Share\Maint.ini *;;Second child*
[conditions]
ProcessChildIfParentConditionFails=0
ProcessChildFirst=0
NumberOfConditions=2
1=%group%=Support
2=%group%=Support_Technical
*;;technical.ini file located at \\TechnicalServer\Share*
[Preferences]
Technical=1*;;Everyone in Technical group has this field set to this 1*
[inifiles]
*;;This section specifies all the children ini files that are to be parsed*
*;;and some rules as to how they are parsed*
NumberOfChildIniFiles=2
1=\\DevServer\Share\Dev.ini *;;First child*
2=\\ArchServer\Share\Arch.ini *;;Second child*
[conditions]
ProcessChildIfParentConditionFails=0
ProcessChildFirst=0
NumberOfConditions=2
1=%group%=Technical
2=%group%=Support_Technical
*;;sales.ini file located at \\SalesServer\Share*
[Preferences]
Sales=1*;;Everyone in Sales sub- group has this field set to this 1*
[conditions]
ProcessChildIfParentConditionFails=0
ProcessChildFirst=0
NumberOfConditions=1
1=%subgroup%=Sales
*;;market.ini file located at \\MarketServer\Share*
[Preferences]
Marketing=1*;;Everyone in Marketing sub-group has this field set to this 1*
[conditions]
NumberOfConditions=1
1=%subgroup%=Marketing
*;;CI.ini file located at \\CIServer\Share*
[Preferences]
CI=1*;;Everyone in Customer Interaction sub-group has this field set to 1*

TABLE 4-continued

Individual Ini Files in the scheme (comments in italics)

```
[conditions]
NumberOfConditions=2
1=%subgroup%=CustomerInteraction
2=%subgroup%= Maintenance, %username%=User3
;;Maint.ini file located at \\MaintServer\Share
[Preferences]
Maintenance=1;;Everyone in Maintenance sub-group has this field set to 1
[conditions]
NumberOfConditions=2
1=%subgroup%=Maintenance
2=%subgroup%= Development_Maintenance
;;Dev.ini file located at \\DevServer\Share
[Preferences]
Development=1;;Everyone in Development sub-group has this
field set to 1
[conditions]
NumberOfConditions=2
1=%subgroup%=Development
2=%subgroup%= Development_Maintenance
;;Arch.ini file located at \\ArchServer\Share
[Preferences]
Architecture=1;;Everyone in Development sub-group has this field set to
1
[conditions]
NumberOfConditions=1
1=%subgroup%=Architecture
;;Logs.ini for User4
[OrgServer$Share$Index.ini]
LastModifiedTimeOfImport=11 Jan 2004 17 30 39
UsernameFolder=User4
[SupportServer$Share$Suport.ini]
LastModifiedTimeOfImport=11 Jan 2004 17 34 56
Group=Support_Technical
[TechnicalServer$Share$Technical.ini]
LastModifiedTimeOfImport=11 Jan 2004 17 35 17
Group=Support_Technical
[MaintServer$Share$Maint.ini]
LastModifiedTimeOfImport=11 Jan 2004 17 36 10
SubGroup= Development_Maintenance
[DevServer$Share$Dev.ini]
LastModifiedTimeOfImport=11 Jan 2004 17 37 23
SubGroup= Development_Maintenance
```

Figure 4:
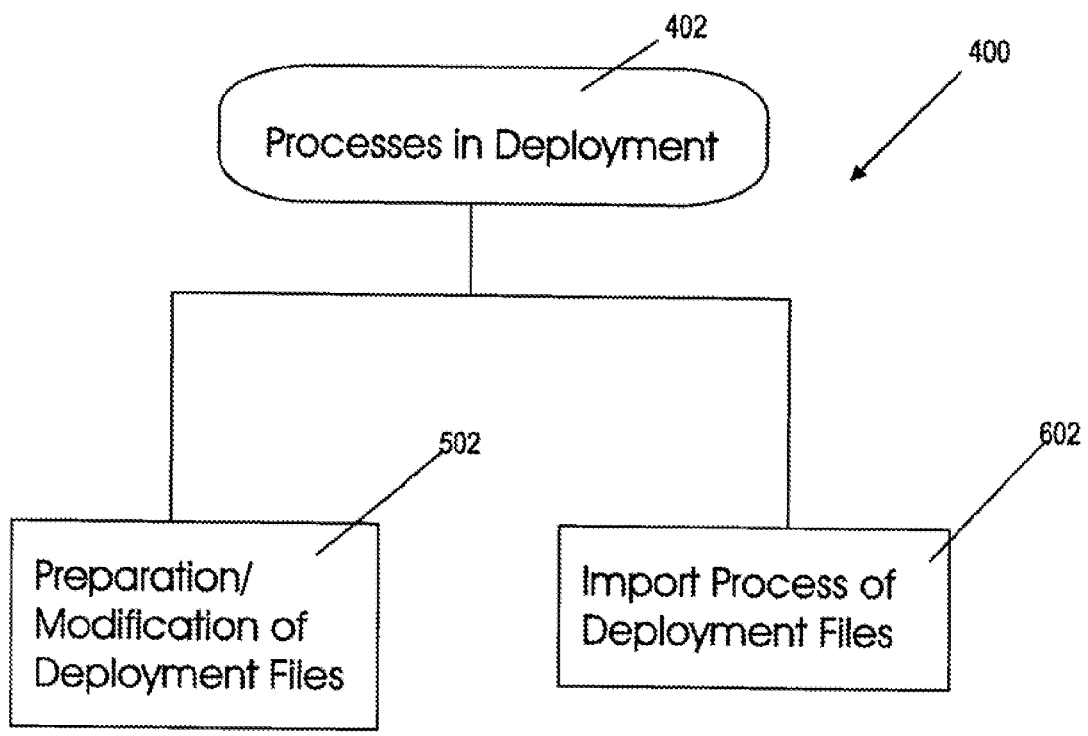
FIG. 4 is a flow chart showing different stages in deployment of user preferences in a multi-tier organization of users.

FIG. 4 shows a flow chart 400 with steps involved in the deployment process. There are two main processes in deployment: Preparation/Modification of Deployment Files at step 502, and Import Process of DeploymentFiles at step 602. At step 602 multiple Ini files are prepared and grouped according to the conditions required by the user.

Figure 5:
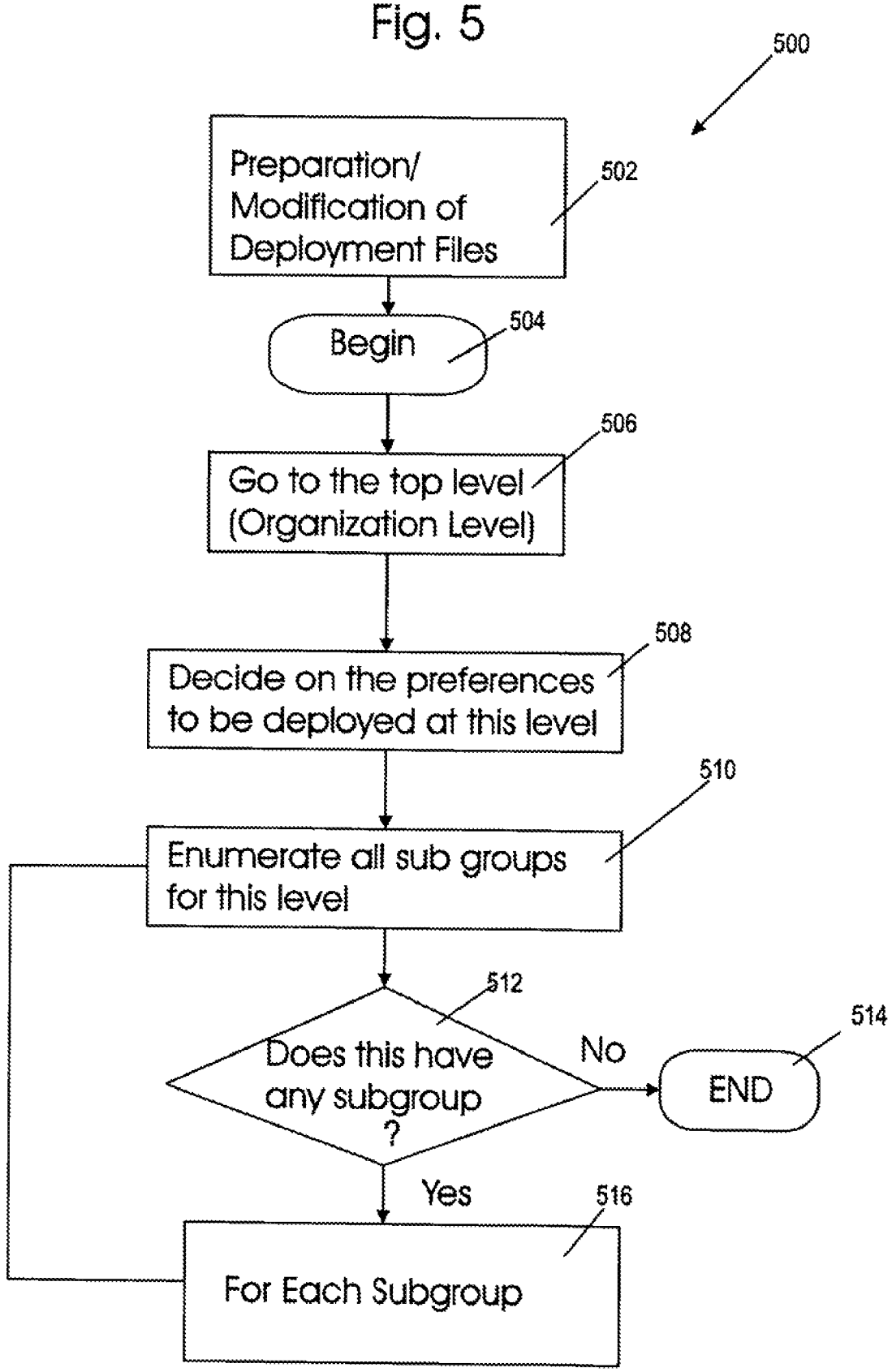
FIG. 5 is a flow chart describing steps in a preparation stage of deployment of user preferences.

FIG. 5 shows a chart 500 showing the steps involved in the preparation/modification of deployment files. Steps 502 and 504 mark the beginning of the process, which is to identify the sequence and levels of the deployment process. Once this is determined, the top level deployment file is first chosen at step 506. The preferences that need to be deployed at this level are decided and placed appropriately in the Ini files at step 508. Once the preferences, sub group files and conditions are identified, the deployment file for that level is created at steps 508. This deployment file would be in the extended Ini file format. Based on step 510, if there are subgroups present at this level, the steps from step 510 are executed for each of the identified subgroups. If further subgroups are not present at the particular level, it marks the end of the deployment preparation at that level.

Figure 6:
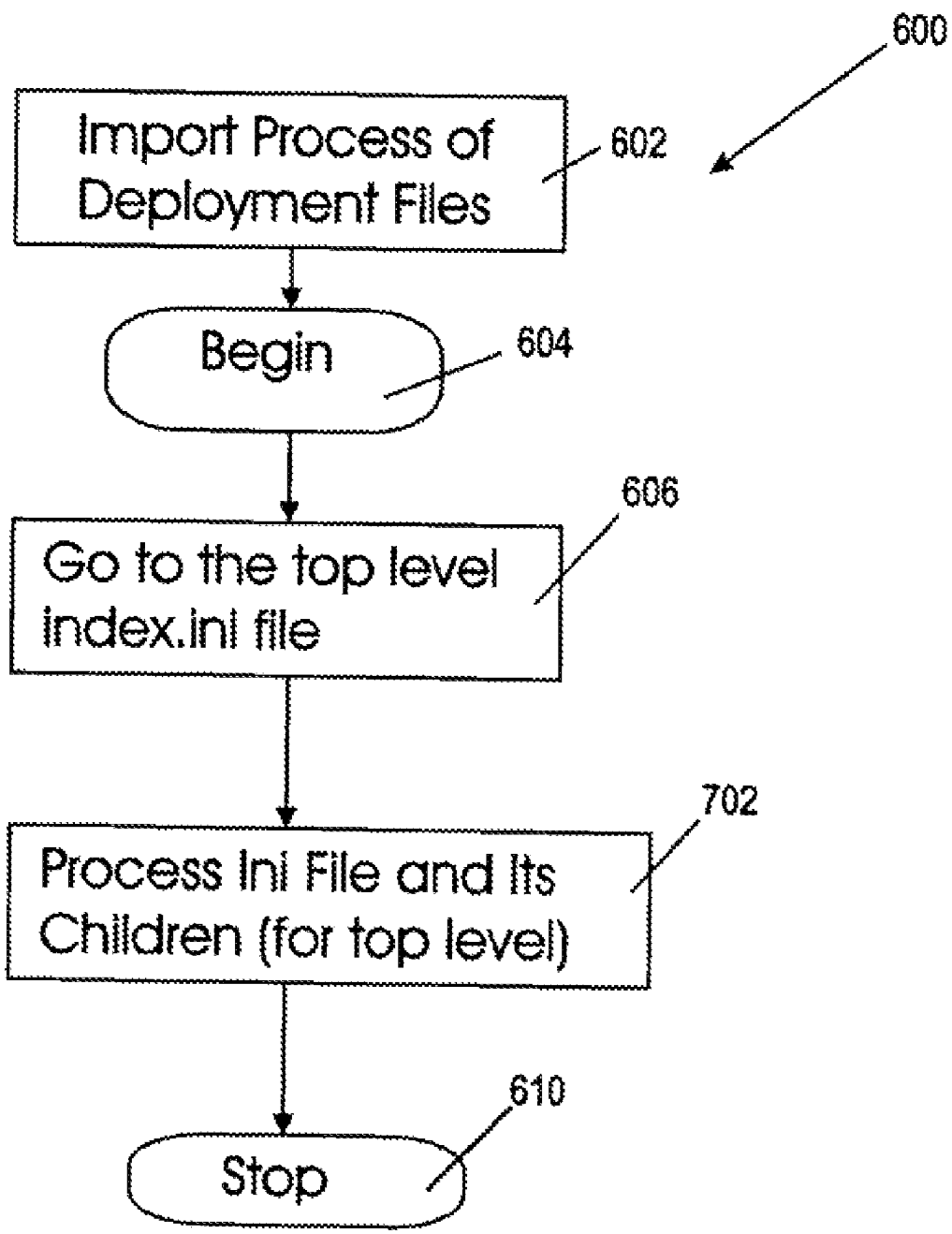
FIG. 6 is a flow chart showing a method of importing deployment files.

The import process of deployment files begins at step 602 shown in FIGS. 4 and 6. FIG. 6 shows a flow chart 600. Step 604 marks the beginning of the import process wherein the top level Index.ini file is determined. The top level index.ini is parsed from the beginning as represented in step 702. The parent Ini file is processed along with its children in step 702.

Figure 7:
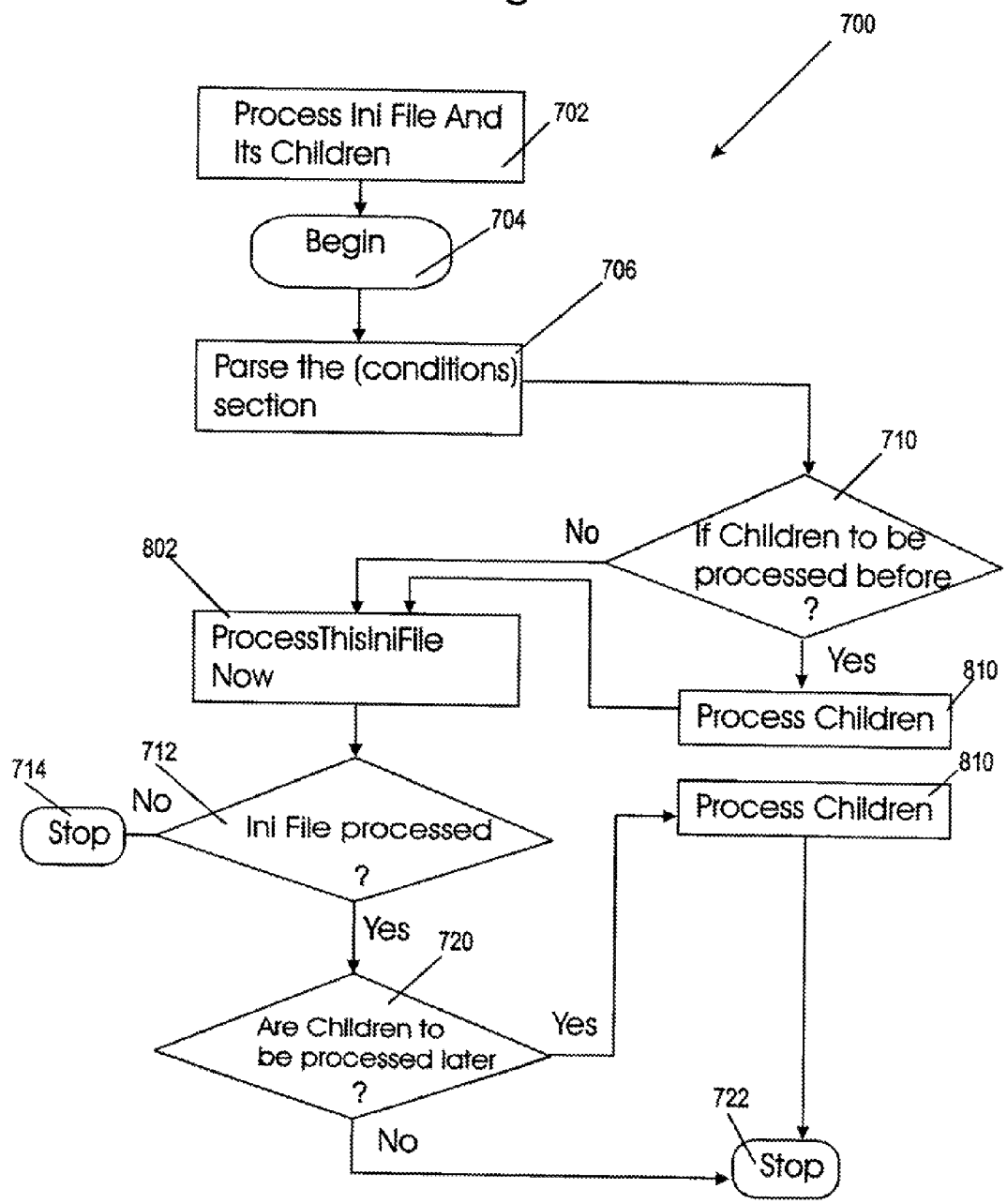
FIG. 7 is a flow chart showing a method of processing the proposed initialization file and the children of this initialization file.

The processing of parsing the parent Ini file along with its children is elaborated in FIG. 7 starting at step 702. Once the parent Ini file and all its children are processed, the import process is considered complete, as represented by step 610 in FIG. 6.

FIG. 7 shows a flow chart 700. FIG. 7, "ProcessIniFileAndItsChildren", elaborates the processing of the parent Ini file along with its children. The beginning of the process is marked by steps 702 and 704. At step 706 the condition section of the Ini file is parsed. The next step 710, is to check if the children of the Ini file are to be parsed before importing entries of the Ini file itself. If yes, then the children Ini files are processed at step 810. If the parent is to be processed before the children, then the current Ini file is processed at the step 802. If step 712 it is determined that this ini file is not to be parsed, because the conditions specified are not satisfied, we exit this call at step 714. Otherwise once the parent Ini file is processed, if the children need to be processed, then each of its children is processed at step 810. When the parent and all the children are parsed and verified for import process, the ProcessIniFileAndItsChildren procedure shown by flow chart 700 ends.

FIG. 8 shows a flow chart 800 for processing of an ini file called, "ProcessThisIniFile". The flow chart 800 depicts steps involved in the processing of an Ini file. The processing is entered at steps 802 and 804. At step 806 one of the IniParser computer program routines 210a-d shown in FIG. 3 checks if this Ini file is to be parsed. The Ini Parse computer program does this by looking at the IniSection "Conditions" table 3. If the conditions are not satisfied, step 808 is taken.

If the ini file conditions are satisfied, then the logs.ini is parsed to see if this ini file needs to be parsed at step 812. If all the settings that would be imported by the ini file are already imported, there is no need to re-import this ini file. This is what the step 812 would determine using logs.ini file. Absence of logs.ini file implies that we need to parse this ini file. This could mean that the user is importing this ini file for the first time. It first checks the time in the IniEntry "LastModifiedTimeOfImport" for the section corresponding to this ini file and sees if the current ini filers time stamp has changed. If it has, then this ini file definitely needs to be parsed. On the other hand, if the time stamp of this ini file has not changed, then the value of each environment variable listed in logs.ini for this ini file are evaluated for its previous and present value. If any of them has changed, this ini file needs to be imported once again. Otherwise, it is not necessary to import this ini file.

If the ini file is not to be imported, this goes to step 808. If the ini file is to be imported, step 818 imports the ini file. In this step, every single IniEntry and IniEntryValue from every section other than "conditions" and "inifiles" are imported and stored in one of the computer program application 211a-d settings. After this ini file is imported, the logs.ini file is updated for this user at step 820). In this step, the time stamp of this ini file is stored along with every single environment variable that was encountered during this ini file parse and stored in the section corresponding to this ini file. Subsequently, this function returns at step 814 specifying that this ini file was processed.

If the conditions for this ini file are not met in step 806, then the next step 808 checks if children in file are to be parsed if the parent fails. This is done by looking in the "conditions" section for the IniEntry ProcessChildIfParentConditionFails shown in Table 3. If this is not set(value 0), then the next step is 816. Otherwise, IniParser 310 shown in FIG. 3, calls ProcessChildren function 810 and then returns from step 816 (specifying this in file was not processed). FIG. 9 shows a flow chart 900 for the steps for the procedure, "ProcessChildren", which concerns the processing of the children of a specified Ini file. In this process, every single ini file listed in the "inifiles" section of the ini file is read and ProcessIniFileAndItsChildren shown in FIG. 7 is executed for it. The process children computer software procedure starts at step 910. The procedure executes through steps 904 and procedure 702 the processing of an ini file and its children. The procedure ends at step 906.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method, comprising
  accepting as input, at a parsing module executing on a client computer, a parent initialization file, wherein the parent initialization file includes one or more override conditions based on membership of a user of the computer in a group and wherein the parent initialization file identifies a child initialization file;
  conditionally processing, in the parsing module, the child initialization file before processing the parent initialization file, if indicated by the one or more of the override conditions;
  conditionally processing, in the parsing module, the child initialization file after processing the parent initialization file, if indicated by the one or more of the override conditions;
  conditionally processing, in the parsing module, the child initialization file without completely processing the parent initialization file, if indicated by the one or more of the override conditions; and
  creating as output, at the parsing module, a set of configuration data, wherein the set of configuration data comprises data for configuration of an application program to be executed on the client computer.

2. A method according to claim 1, wherein the set of configuration data comprises data for configuration of hardware for the client computer.

3. A method according to claim 1, wherein the parent and child initialization files are text based.

4. A method according to claim 1, wherein the client computer receives an updated parent or child initialization file, from a server computer, when the initialization file changes according to a log file on the client computer.

5. A method according to claim 1, wherein the client computer re-processes the parent and child initialization files if there has been a change in an environmental variable referenced in the parent or child initialization file.

6. A method according to claim 1, wherein the parent and child initialization files conform to an extended format for initialization files.

7. A method according to claim 6, wherein the extended format comprises a section in a parent initialization file which counts and lists zero or more child initialization files.

8. A method according to claim 6, wherein the extended format comprises a section in an initialization file which counts and describes zero or more conditions for processing the initialization file.

9. A method according to claim 6, wherein the extended format comprises a Boolean variable which allows a child initialization file to be processed upon failure of a condition in the parent initialization file.

10. A method according to claim 6, wherein the extended format comprises a Boolean variable which allows the child initialization file to be processed before further processing of the parent initialization file.

11. Software encoded in one or more computer-readable media and when executed operable to:
  accept as input, at a parsing module executing on a client computer, a parent initialization file, wherein the parent initialization file includes one or more override conditions based on membership of a user of the computer in a group and wherein the parent initialization file identifies a child initialization file;
  conditionally process, in the parsing module, the child initialization file after processing the parent initialization file, if so indicated by the one or more of the override conditions;
  conditionally process, in the parsing module, the child initialization file before processing the parent initialization file, if so indicated by the one or more of the override conditions;
  conditionally process, in the parsing module, the child initialization file without completely processing the parent initialization file, if indicated by the one or more of the override conditions; and
  create as output, at the parsing module, a set of configuration data, wherein the set of configuration data comprises data for configuration of an application program to be executed on the client computer.

12. Software according to claim 11, wherein the set of configuration data comprises data for configuration of hardware for the client computer.

13. Software according to claim 11, wherein the parent and child initialization files are text based.

14. Software according to claim 11, wherein the client computer receives an updated parent or child initialization file, from a server computer, when the initialization file changes according to a log file on the client computer.

15. Software according to claim 11, wherein the client computer re-processes the parent and child initialization files if there has been a change in an environmental variable referenced in the parent or child initialization file.

16. Software according to claim 11, wherein the parent and child initialization files conform to an extended format for initialization files.

17. Software according to claim 16, wherein the extended format comprises a section in a parent initialization file which counts and lists zero or more child initialization files.

18. Software according to claim 16, wherein the extended format comprises a section in an initialization file which counts and describes zero or more conditions for processing the initialization file.

19. Software according to claim 16, wherein the extended format comprises a Boolean variable which allows a child initialization file to be processed upon failure of a condition in the parent initialization file.

20. Software according to claim 16, wherein the extended format comprises a Boolean variable which allows the child initialization file to be processed before further processing of the parent initialization file.

* * * * *